United States Patent
Le et al.

(10) Patent No.: US 7,558,019 B2
(45) Date of Patent: Jul. 7, 2009

(54) PERPENDICULAR MAGNETIC RECORDING WRITE HEAD WITH FLUX-CONDUCTOR CONTACTING WRITE POLE

(75) Inventors: Quang Le, San Jose, CA (US); James L. Nix, Gilroy, CA (US); Neil Leslie Robertson, Palo Alto, CA (US); Neil Smith, San Jose, CA (US); Petrus Antonius VanDerHeijden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 428 days.

(21) Appl. No.: 11/560,761

(22) Filed: Nov. 16, 2006

(65) Prior Publication Data
US 2008/0117546 A1      May 22, 2008

(51) Int. Cl.
*G11B 5/10* (2006.01)
*G11B 5/127* (2006.01)

(52) U.S. Cl. .................... 360/125.06; 360/125.12; 360/125.14

(58) Field of Classification Search ............ 360/125.06, 360/125.07, 125.08, 125.12, 125.14
See application file for complete search history.

(56) References Cited

U.S. PATENT DOCUMENTS

| | | | |
|---|---|---|---|
| 7,002,775 B2 | 2/2006 | Hsu et al. | |
| 2003/0137779 A1* | 7/2003 | Santini et al. | 360/317 |
| 2005/0068671 A1 | 3/2005 | Hsu et al. | |
| 2006/0082924 A1 | 4/2006 | Etoh et al. | |
| 2006/0203384 A1* | 9/2006 | Maruyama et al. | 360/126 |
| 2007/0139818 A1* | 6/2007 | Shimazawa et al. | 360/126 |
| 2007/0146931 A1* | 6/2007 | Baer et al. | 360/126 |
| 2007/0247749 A1* | 10/2007 | Bonhote et al. | 360/126 |
| 2008/0273268 A1* | 11/2008 | Hsiao et al. | 360/234.6 |

* cited by examiner

*Primary Examiner*—Jefferson Evans
(74) *Attorney, Agent, or Firm*—Thomas R. Berthold

(57) ABSTRACT

A perpendicular magnetic recording write head has a flux conductor in contact with the write pole. The flux conductor is substantially wider than the write pole tip in the cross-track direction and has a blunt end that is recessed from the pole tip end. The region of the flux conductor where its blunt end is in contact with the pole tip is the "choke" point for the write pole, i.e., the point where the flux density is highest. The flux conductor enables the write pole to be made with no flare, or with a flare angle and throat height with a much wider tolerance, which substantially simplifies the manufacturing process. The write head may have a trailing shield and side shields that substantially surround the write pole tip and remove stray fields that may be produced by the flux conductor, so that regions of the recording layer other than the track being written are not adversely affected.

17 Claims, 6 Drawing Sheets

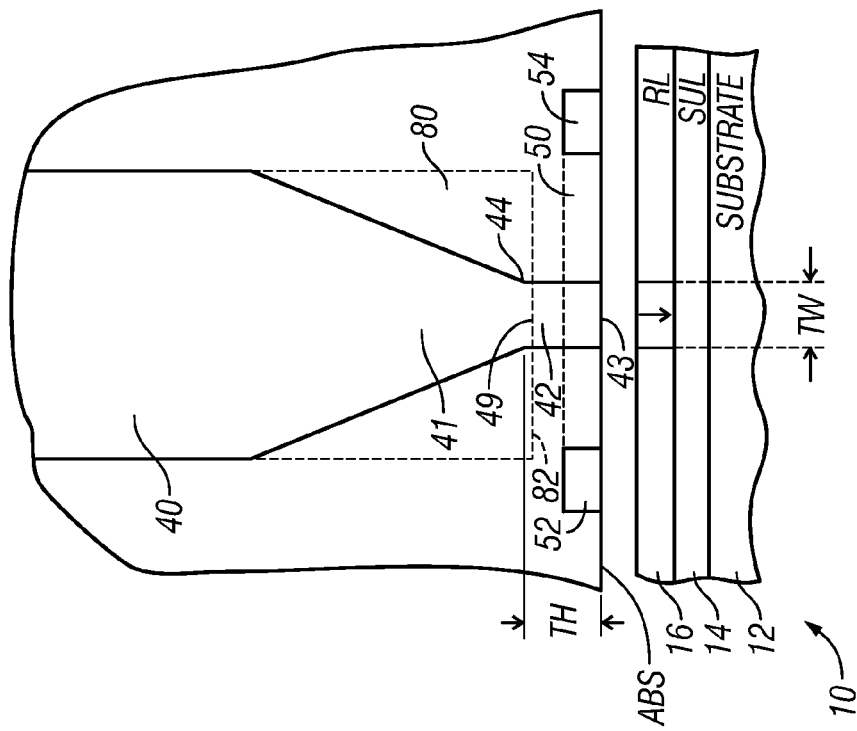
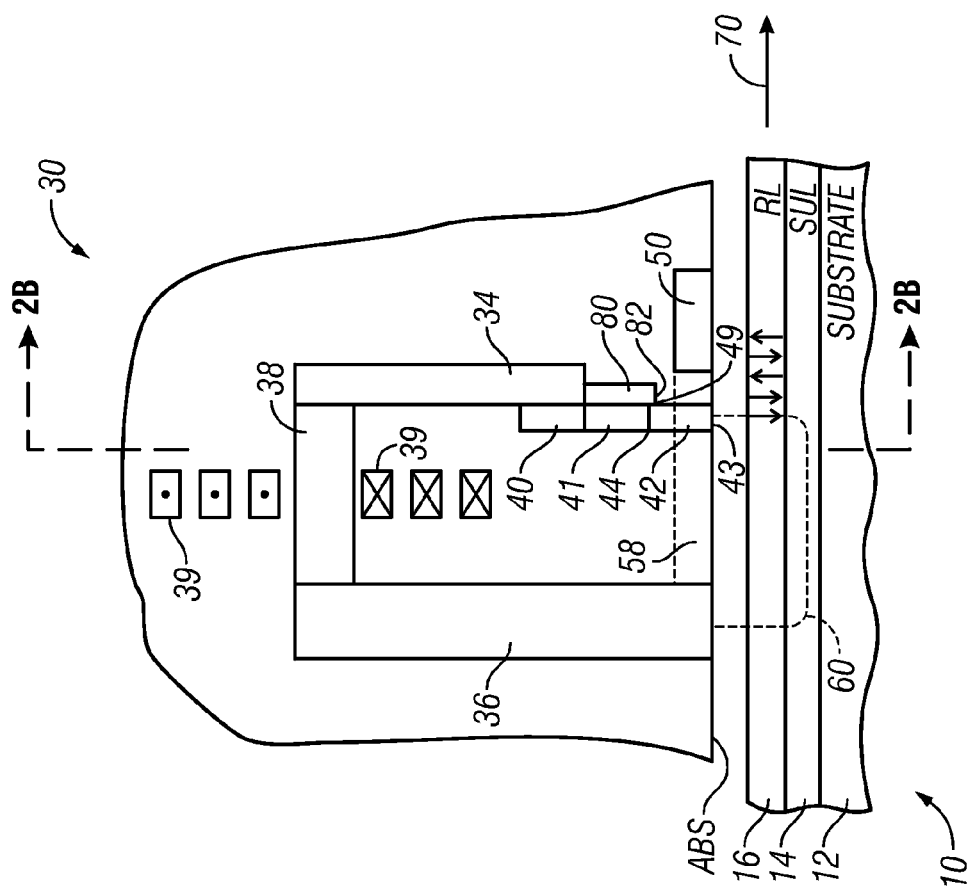
FIG. 2A
FIG. 2B

PERPENDICULAR MAGNETIC RECORDING WRITE HEAD WITH FLUX-CONDUCTOR CONTACTING WRITE POLE

BACKGROUND OF THE INVENTION

1. Field of the Invention

This invention relates generally to perpendicular magnetic recording write heads, and more particularly to a write head with a write pole having improved flux conduction.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The recording head write pole must have a very narrow pole tip to achieve a narrow track width and thus high track density. However, the write pole must also be flared out into a larger flux-carrying body away from, but still relatively close to, the end of the write pole tip to achieve the required write field and write field gradient necessary for ultra-high density recording. The fabrication of the flared write pole, particularly the flare point location (which defines the "throat height" of the write pole tip) and the flare angle are difficult to control with precision during manufacturing.

What is needed is a perpendicular magnetic recording write head with a write pole that does not require precise control of the flare point and flare angle.

SUMMARY OF THE INVENTION

The invention is a perpendicular magnetic recording write head with a flux conductor in contact with the write pole. The flux conductor is substantially wider than the write pole tip in the cross-track direction and has a blunt or generally planar end that is recessed from the pole tip end. The flux conductor, which is in contact with the write pole above and below the flare point, acts as a flux shaping layer to carry some of the flux away from flare point. The region of the flux conductor where its blunt end is in contact with the pole tip is the "choke" point for the write pole, i.e., the point where the flux density is highest. The flux conductor enables the write pole to be made with no flare, or with a flare angle and throat height with a much wider tolerance, which substantially simplifies the manufacturing process. The write head may have a trailing shield and side shields that substantially surround the write pole tip and remove stray fields that may be produced by the flux conductor, so that regions of the recording layer other than the track being written are not adversely affected.

For a fuller understanding of the nature and advantages of the present invention, reference should be made to the following detailed description taken together with the accompanying figures.

BRIEF DESCRIPTION OF THE DRAWING

FIG. 2A is a sectional view of a first embodiment of the write head according to this invention.

FIG. 2B is a view in the direction 2B-2B of FIG. 2A and illustrates the flux conductor in contact with the flared write pole.

DETAILED DESCRIPTION OF THE INVENTION

Figures 1A, 1B:
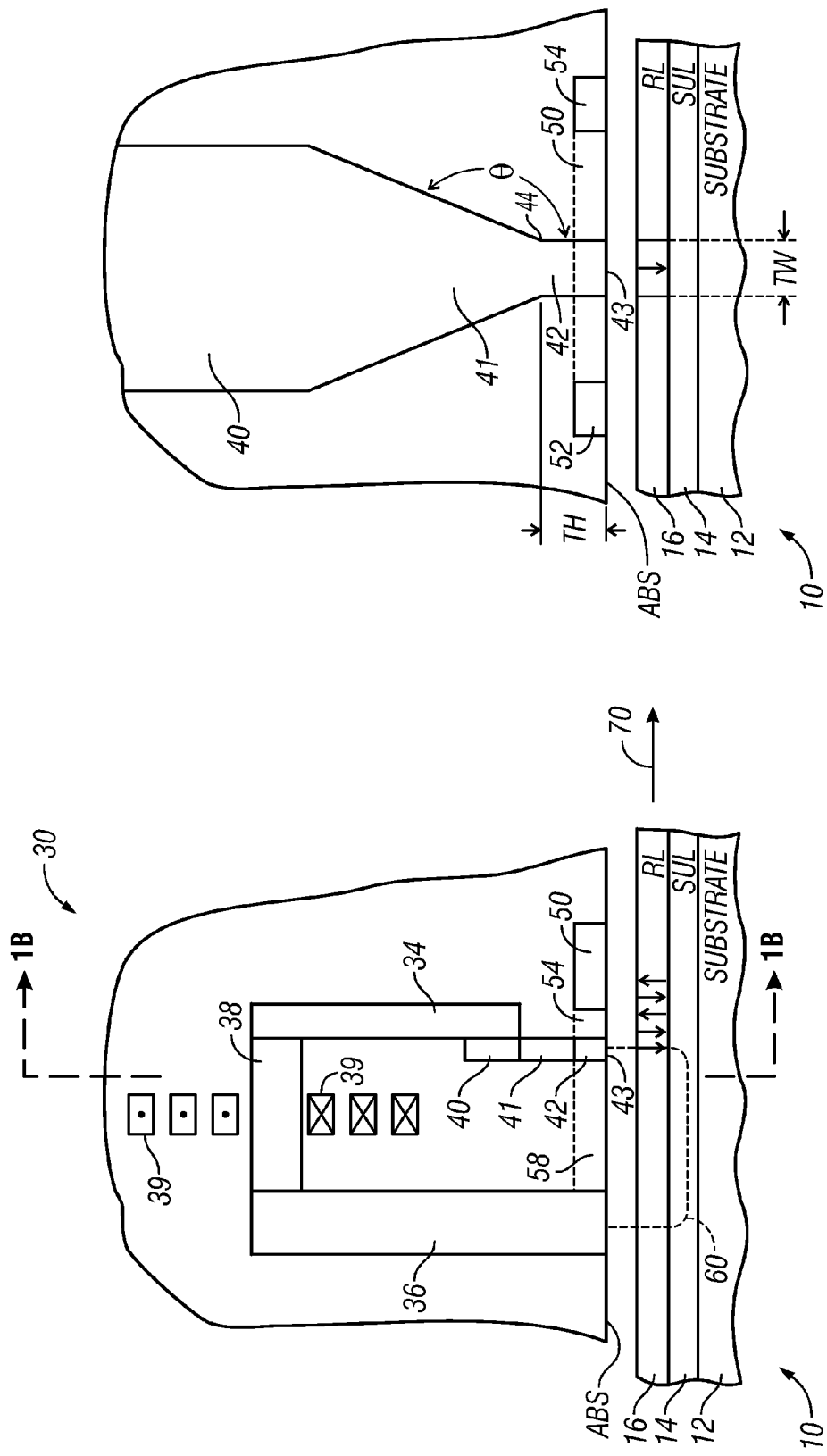
FIG. 1A is a sectional view of a prior art perpendicular magnetic recording system showing a write head and recording medium.
FIG. 1B is a view in the direction 1B-1B of FIG. 1A and illustrates the width of the WP to substantially define the trackwidth (TW) of the data recorded in the recording layer (RL).

As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a single write pole type of recording or write head 30. The recording head 30 includes a yoke made up of the main pole 34, flux return pole 36, and yoke stud 38 connecting the main pole and return pole 36; and a thin film coil 39 shown in section wrapped around yoke stud 38. A flared write pole (WP) 40 is part of the main pole 34 and has a flared portion 41 and a pole tip 42 with an end 43 that faces the outer surface of medium 10. Write current through coil 39 induces a magnetic field (shown by dashed line 60) from the WP 40 that passes through the RL 16 (to magnetize the region of the RL 16 beneath the WP 40), through the flux return path provided by the SUL 14, and back to the return pole 36. The recording head is typically formed on an air-bearing slider that has its air-bearing surface (ABS) supported above the surface of medium 10. In FIG. 1A, the medium 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely-directed magnetized regions are detectable by the read head (not shown) as the recorded bits. FIG. 1A also illustrates portions 50, 54 of a "wraparound" shield and a connecting stud 58 that are described in more detail in FIGS. 1B-1C.

FIG. 1B is a view in the direction 1B-1B of FIG. 1A and better illustrates the flare region 41 of flared WP 40. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a "height" from end 43 to flare point 44 called the throat height (TH). As shown in FIG. 1B, the two side walls of WP tip 42 define its width in the cross-track direction, which substantially defines the trackwidth (TW) of the data recorded in the RL 16. The region of the WP 40 above the flare region 41 is substantially wider than WP tip 42 below the flare region 41 and the flare point 44 is the transition point where the WP 40 begins to widen with distance from the ABS. The angle θ in FIG. 1B is called the flare angle and is between 90 and 180 degrees, typically between about 120 and 150 degrees. FIG. 1B also illustrates portions of the wraparound shield that generally surrounds the WP tip 42 and includes side shields 52, 54 and a trailing shield (TS) 50.

Figure 1C:
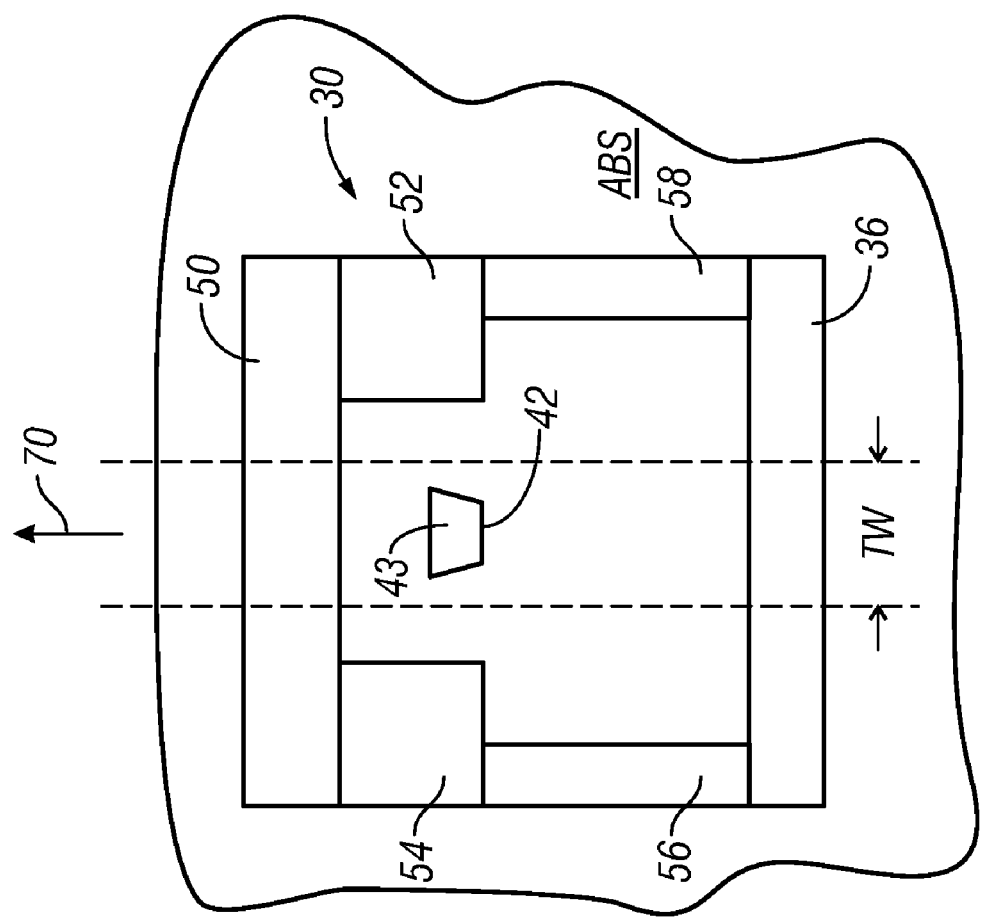
FIG. 1C is a view from the air-bearing surface (ABS) of the prior art write head in FIG. 1A and shows a wraparound shield substantially surrounding the write pole tip and connected to the return pole.

FIG. 1C illustrates the recording head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider or head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface. The recording medium 10 moves relative to the head 30 in the direction 70, which is called the down-track direction. The dashed lines in FIG. 1C represent the sides of a data track. The width of the end 43 of write pole tip 21 substantially defines the track-width (TW) of the data tracks in the RL 16. The direction perpendicular to direction 70 and parallel to the plane of the ABS is called the cross-track direction.

The wraparound shield that includes side shields 52, 54 and TS 50 is described in detail as a shield for a conventional perpendicular recording head in U.S. Pat. No. 7,002,775 B2 assigned to the same assignee as this application. The shields 50, 52, 54 all have ends substantially at the recording-layer-facing surface. Side shields 52, 54 may be connected to return pole 36 by studs 56, 58, respectively, also formed of soft ferromagnetic material. The shields 50, 52, 54 are typically connected to one another and substantially surround the WP pole tip 42 to from a "wraparound" shield. The TS 50 and side shields 52, 54 are separated from WP tip 42 by nonmagnetic gap material, typically alumina. The wraparound shield with shields 50, 52, 54 separated from the WP tip 42 by nonmagnetic gap material alters the angle of the write field and improves the write field gradient at the point of writing, and also shields the writing field at regions of the medium 10 away from the track being written. The wraparound shield is shown as being connected to the return pole 36 by studs 56, 58 but it may also be a "floating" shield, meaning that it is not connected to either the return pole 36 or other portions of the yoke by flux-conducting material.

The yoke and shields of head 30 are formed of soft ferromagnetic material, such as alloys of NiFe, CoFe and NiFeCo. The WP 40 is formed of a high-moment material, such as a high-moment CoFe alloy, and may be a laminated structure.

The WP 40 is required to be flared out into a larger flux-carrying body, as shown in FIG. 1B, to achieve the required write field and write field gradient necessary for ultra high density recording, i.e., greater than about 200 Gbits/in². However, the fabrication and control of the flare point 44, specifically its flare angle and its location above the end 43 of WP tip 42, i.e., the TH, are very difficult to control during manufacturing of the write head.

In this invention, as illustrated in FIGS. 2A-2B, a flux conductor 80 is located in contact with the WP 40 and main pole 34. The flux conductor 80 can be formed of the same material used for the yoke and shields. Flux conductor 80 is substantially wider than the WP tip 42 in the cross-track direction and has an end 82 that does not extend to the ABS. The end 82 may be a "blunt" end, meaning that it is generally flat or planar and is not required to have a flare, which simplifies the manufacturing process. As shown in FIG. 2A, the flux conductor end 82 is located farther from the ABS than the TS 50 but below the flare point 44, i.e., closer to the ABS than flare point 44. The flux conductor 80, which is in contact with the WP 40 above and below the flare point 44, acts as a flux shaping layer to carry some of the flux away from flare point 44. While not illustrated in FIGS. 2A-2B the flux conductor 80 may also overlap the side walls of flare region 41 and WP tip 42 (i.e., the spaced-apart sides of flare region 41 and WP tip 42 that define their respective cross-track widths) near the flare point 44. The region 49 where the blunt end 82 is in contact with pole tip 42 now becomes the choke point for the WP 40. As a result, the flare angle and the TH can have a much wider tolerance, which simplifies the manufacturing process of the flared WP 40. The wraparound shield (side shields 52, 54 and TS 50) removes stray fields that may be produced by the flux conductor 80 with its blunt end 82 near but recessed from the ABS, so that regions of the RL other than the track being written are not adversely affected.

Figure 2C:
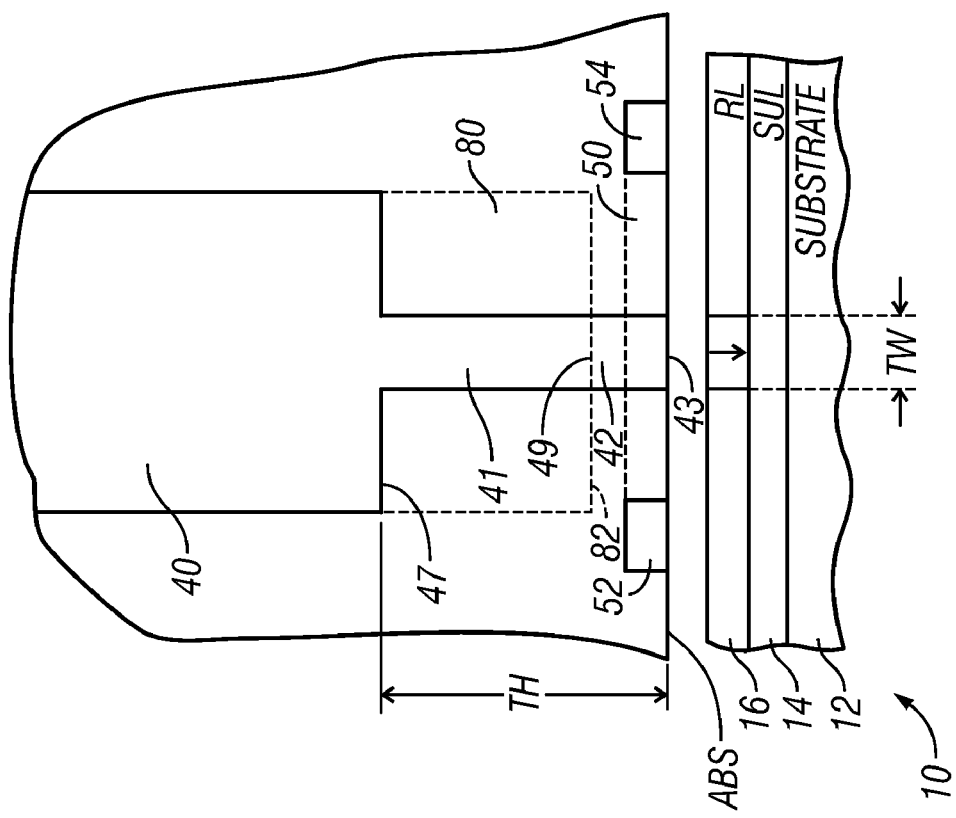
FIG. 2C illustrates an implementation wherein the flux conductor permits the write pole to have no flare or a flare angle of 90 degrees.

In FIG. 2B, the flare point 44 is the transition point where the width of the WP 40 transitions to its wider portion. The transition point defines the TH. FIG. 2C illustrates an implementation wherein the flux conductor 80 permits the WP 40 to have a "degenerate" flare, i.e. no flare or a flare angle of 90 degrees. In this embodiment the flat surface 47 of WP 40 is the transition point that defines the TH. The blunt end 82 of flux conductor 80 is located between the ABS and surface 47. The region 49 where the blunt end 82 is in contact with pole tip 42 is the choke point for the WP 40.

Figure 3A:
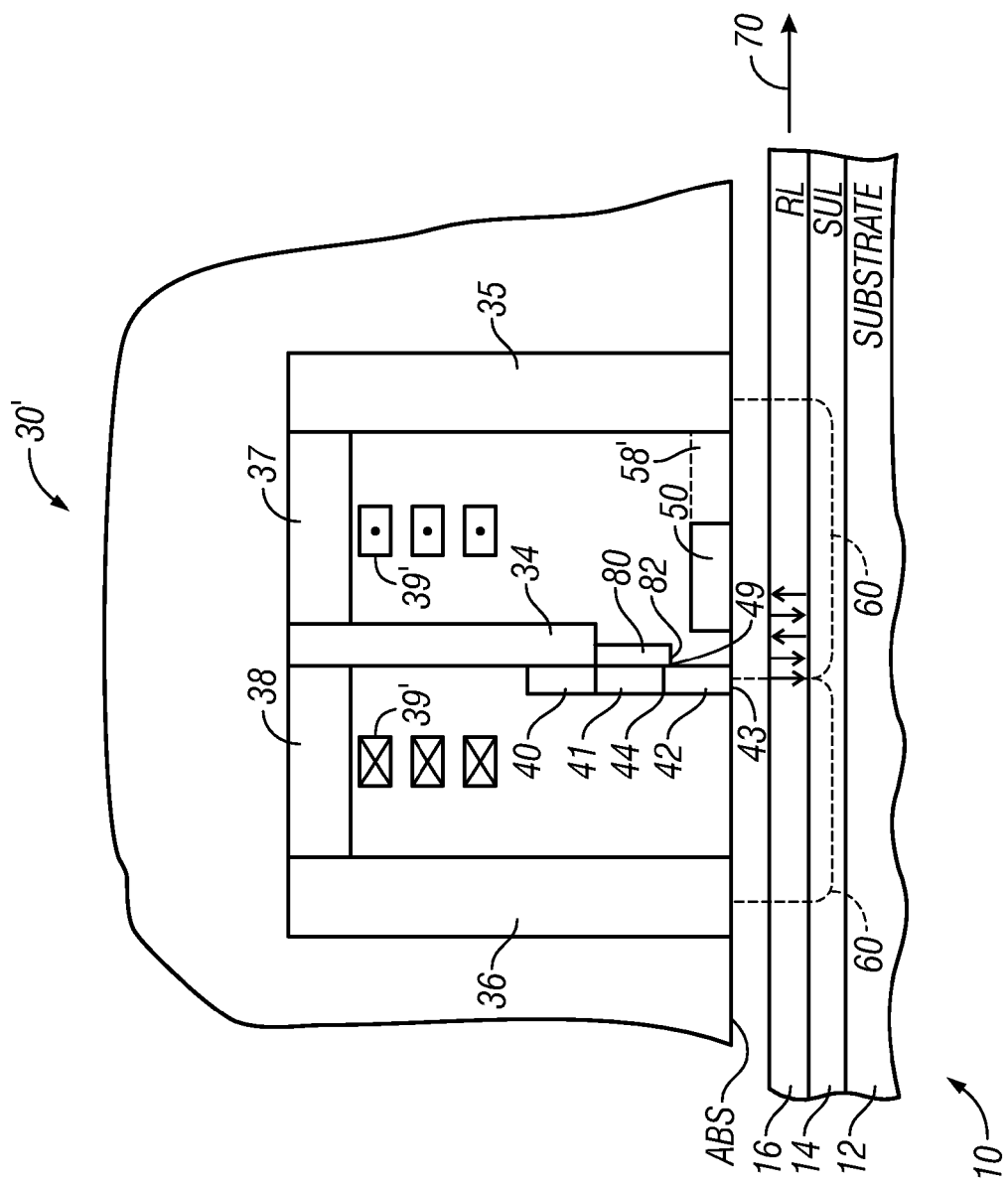
FIG. 3A is a sectional view of a second embodiment of the write head according to this invention showing a second return pole.
Figure 3B:
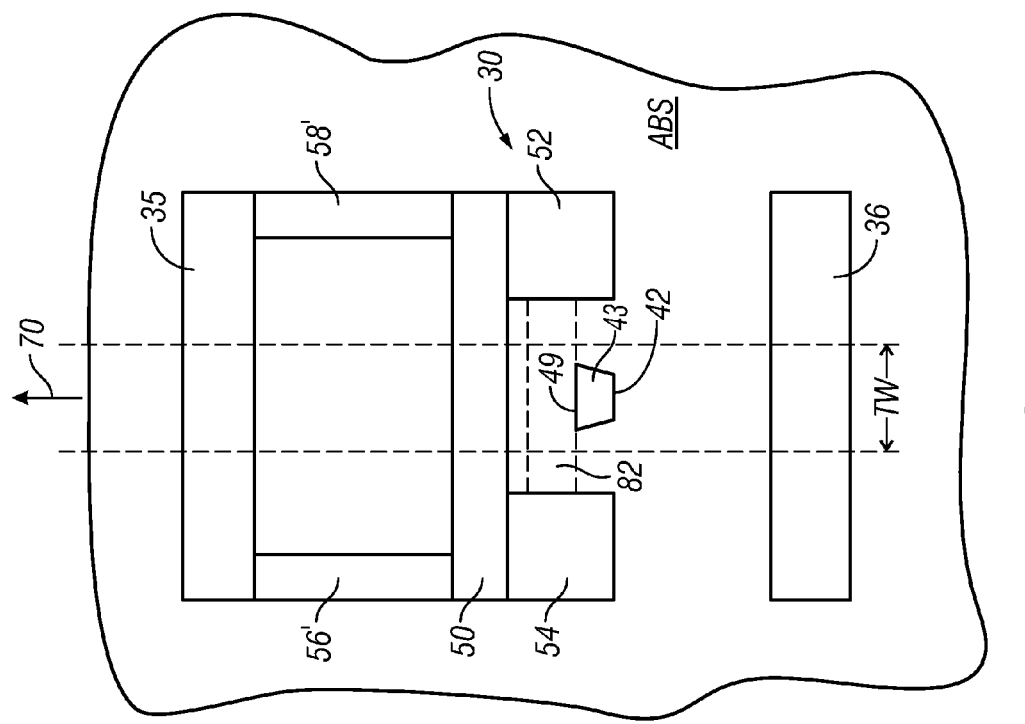
FIG. 3B is a view from the air-bearing surface of the write head in FIG. 3A and shows the end of the flux conductor in contact with the write pole tip and a wraparound shield substantially surrounding the write pole tip and connected to the second return pole.

Another embodiment of a perpendicular write head with the invention is shown in FIGS. 3A-3B. The write head 30' includes a second return pole 35. The yoke of head 30' thus includes second return pole 35 and connecting stud 37. The dashed lines 60 illustrate the flux return path from the write pole tip end 43 to the first return pole 36 and second return pole 35. This embodiment also shows the coil 39' as a helical coil wrapped around main pole 34. A helical coil may also be used in the embodiment of FIG. 2A. As shown in FIG. 3B, and in contrast to FIG. 1C, the wraparound shield (side shields 52, 54 and TS 50) are connected to second return pole 35 by studs 58', 56'. However, the wraparound shield may also be a floating shield. FIG. 3B also illustrates the end 82 of flux conductor 80, shown in dashed lines because it is recessed from the ABS, and the choke point region 49 where flux conductor end 82 is in contact with pole tip 42. Like the embodiment shown in FIGS. 2A-2C, the WP 40 in FIG. 3A may have a conventional flare (FIG. 2B) or no flare (FIG. 2C).

In both embodiments, the flux conductor 80 may also include an optional seed layer to enhance the growth of the flux conductor if the flux conductor is deposited by sputtering or plating. The seed layer portion of the flux conductor 80 is in contact with the WP 40 and located between the WP 40 and the main portion of the flux conductor 80. The seed layer may be a very thin layer of nonmagnetic material, such as a film of Rh or Au approximately 1 nm thick, or a magnetic material, such as NiFe.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions in data tracks of a magnetic recording layer comprising:

a main pole;

a write pole connected to the main pole and having a cross-track width at an end facing the recording layer and a wider cross-track width at a region recessed from the end, the write pole having a throat height from its end to a transition point where its width transitions to its wider width;

an electrically conductive helical coil wrapped around the main pole for generating magnetic flux in the main pole and its connected write pole;

a flux conductor connected to the main pole, the flux conductor being in contact with the write pole at its transition point and along a portion of its throat height and having a cross-track width greater than the cross-track width of the write pole end;

a trailing shield having an end generally coplanar with the write pole end and spaced from the write pole end in the along-the-track direction; and a return pole.

2. The write head of claim of claim 1 wherein the write pole is a flared write pole having a flare region between the transition point and the wider region.

3. The write head of claim of claim 1 wherein the flux conductor has an end recessed from the write pole end.

4. The write head of claim of claim 3 wherein the flux conductor end is generally planar.

5. The write head of claim of claim 1 wherein the flux conductor includes a seed layer, the seed layer being in contact with the write pole at its transition point and along a portion of its throat height.

6. The write head of claim 1 wherein the return pole is a first return pole and the along-the-track direction from the main pole to the return pole is uptrack, and further comprising a second return pole downtrack from the main pole.

7. The write head of claim 1 further comprising a pair of side shields having ends generally coplanar with the write pole end and spaced on opposite sides from the write pole end in the cross-track direction.

8. The write head of claim 7 wherein the side shields and trailing shield are contiguous, thereby forming a wraparound shield.

9. The write head of claim 1 wherein the return pole is connected to the main pole by a yoke and wherein the trailing shield is a floating shield not connected to the return pole or the yoke.

10. The write head of claim 1 wherein the return pole is connected to the main pole by a yoke and wherein the trailing shield is connected to one of the return pole and the yoke.

11. A magnetic recording disk drive perpendicular recording write head for magnetizing regions in data tracks of a magnetic recording layer on the disk, the head being formed on a slider having an air-bearing surface (ABS) facing the recording layer and comprising:

a main pole;

a write pole connected to the main pole and having a cross-track width at an end substantially at the ABS and a wider cross-track width at a region recessed from the ABS, the write pole having a throat height from its end to a transition point where its width transitions to its wider width;

an electrically conductive coil coupled to the main pole for generating magnetic flux in the main pole and its connected write pole;

a flux conductor having a seed layer portion and being connected to the main pole, the flux conductor seed layer portion being in contact with the write pole at its transition point and along a portion of its throat height, the flux conductor having a cross-track width greater than the cross-track width of the write pole end and a generally planar end between the ABS and the transition point;

a trailing shield having an end generally coplanar with the write pole end and spaced from the write pole end in the along-the-track direction;

a pair of side shields having ends generally coplanar with the write pole end and spaced on opposite sides from the write pole end in the cross-track direction; and a return pole.

12. The write head of claim 11 wherein the write pole is a flared write pole having a flare region between the transition point and the wider region.

13. The write head of claim 11 wherein the coil is a helical coil wrapped around the main pole.

14. The write head of claim 11 wherein the return pole is a first return pole connected to the main pole by a yoke and the along-the-track direction from the main pole to the return pole is uptrack, and further comprising a second return pole downtrack from the main pole.

15. The write head of claim 14 wherein the trailing shield and side shields are connected to the second return pole.

16. The write head of claim 11 wherein the side shields and trailing shield are contiguous, thereby forming a wraparound shield.

17. A perpendicular magnetic recording write head for magnetizing regions in data tracks of a magnetic recording layer comprising:

a main pole;

a write pole connected to the main pole and having a cross-track width at an end facing the recording layer and a wider cross-track width at a region recessed from the end, the write pole having a throat height from its end to a transition point where its width transitions to its wider width;

an electrically conductive coil coupled to the main pole for generating magnetic flux in the main pole and its connected write pole;

a flux conductor connected to the main pole, the flux conductor being in contact with the write pole at its transition point and along a portion of its throat height and having a cross-track width greater than the cross-track width of the write pole end;

a trailing shield having an end generally coplanar with the write pole end and spaced from the write pole end in the along-the-track direction;

a return pole; and a yoke connecting the return pole to the main pole, wherein the trailing shield is connected to one of the return pole and the yoke.

* * * * *